(12) United States Patent
Oh et al.

(10) Patent No.: US 9,294,536 B2
(45) Date of Patent: Mar. 22, 2016

(54) METHOD AND SYSTEM OF COMMUNICATING DELIVERY STATUS OF AN XDM RESOURCE IN AN XDM ENVIRONMENT

(75) Inventors: Gyu-Bong Oh, Suwon-si (KR); Arun Prasath Ramamoorthy, Bangalore (IN)

(73) Assignee: Samsung Electronics Co., Ltd (KR)

( * ) Notice: Subject to any disclaimer, the term of this patent is extended or adjusted under 35 U.S.C. 154(b) by 228 days.

(21) Appl. No.: 13/641,011

(22) PCT Filed: Apr. 12, 2011

(86) PCT No.: PCT/KR2011/002598
§ 371 (c)(1),
(2), (4) Date: Oct. 12, 2012

(87) PCT Pub. No.: WO2011/129600
PCT Pub. Date: Oct. 20, 2011

(65) Prior Publication Data
US 2013/0041942 A1 Feb. 14, 2013

(30) Foreign Application Priority Data
Apr. 12, 2010 (IN) .......................... 1005/CHE/2010

(51) Int. Cl.
*H04L 29/08* (2006.01)
(52) U.S. Cl.
CPC ...................................... *H04L 67/02* (2013.01)
(58) Field of Classification Search
CPC ............. G06F 17/30; G06F 17/30011; H04L 65/1006; H04L 67/02
USPC .......... 370/352; 709/202–204, 206, 219, 223, 709/226; 715/200, 234
See application file for complete search history.

(56) References Cited

U.S. PATENT DOCUMENTS

| | | | |
|---|---|---|---|
| 2003/0236903 A1 | 12/2003 | Piotrowski | |
| 2006/0155726 A1 | 7/2006 | Krasun et al. | |
| 2007/0106737 A1* | 5/2007 | Barnes et al. | 709/206 |
| 2008/0046482 A1 | 2/2008 | Oh et al. | |
| 2008/0104124 A1* | 5/2008 | Bao et al. | 707/104.1 |
| 2009/0063649 A1* | 3/2009 | Yamagishi | 709/207 |
| 2009/0086725 A1* | 4/2009 | Lai et al. | 370/352 |

(Continued)

FOREIGN PATENT DOCUMENTS

| | | |
|---|---|---|
| WO | WO 2008/020720 | 2/2008 |
| WO | WO2008041829 | 4/2008 |

OTHER PUBLICATIONS

PCT/ISA/237 Written Opinion issued on PCT/KR2011/002598 (pp. 3).
PCT/ISA/210 Search Report issued on PCT/KR2011/002598 (pp. 3).

*Primary Examiner* — Brian J Gillis
*Assistant Examiner* — Gil H. Lee
(74) *Attorney, Agent, or Firm* — The Farrell Law Firm, P.C.

(57) ABSTRACT

A method of an eXtensible Markup Language (XML) Document Management (XDM) server for communicating a delivery status of an XDM resource in an XDM environment is provided. The method includes receiving a request for forwarding the XDM resource to one or more intended XDM recipient devices from an XDM client device; forwarding the XDM resource to the one or more intended XDM recipient devices; and communicating the delivery status associated with delivery of the XDM resource to the one or more intended XDM recipient devices to the XDM client device.

18 Claims, 5 Drawing Sheets

(56) References Cited

U.S. PATENT DOCUMENTS

2009/0204686 A1* 8/2009 Yoda et al. .................. 709/218
2010/0217988 A1* 8/2010 Johnson ....................... 713/175
2010/0325225 A1* 12/2010 Petronijevic et al. ......... 709/206

* cited by examiner

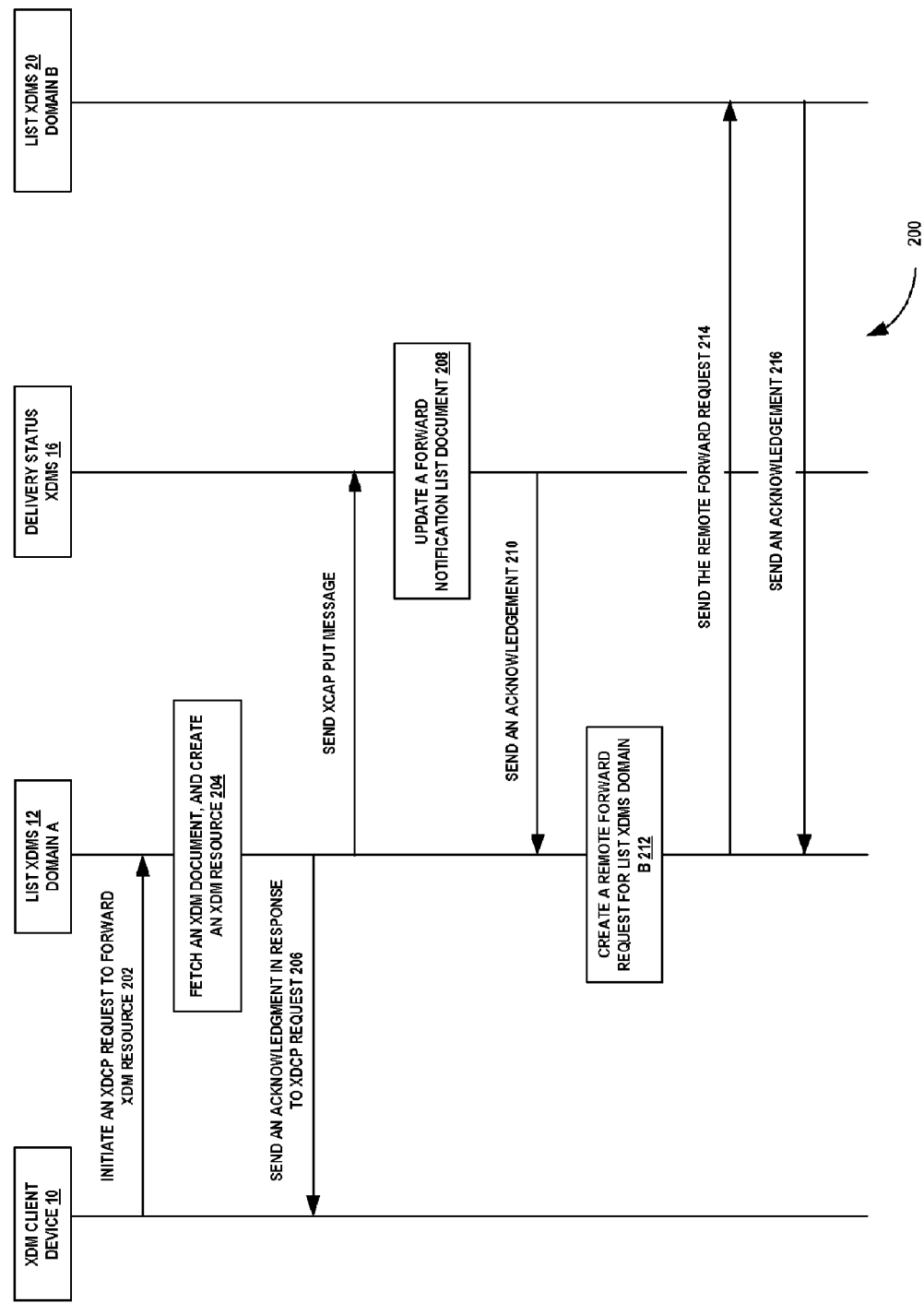

METHOD AND SYSTEM OF COMMUNICATING DELIVERY STATUS OF AN XDM RESOURCE IN AN XDM ENVIRONMENT

PRIORITY

This application claims priority under 35 U.S.C. §119(a) to an Indian Patent Application filed in the Indian Patent Office on Apr. 12, 2010 and assigned Serial No. 1005/CHE/2010, and International Application No. PCT/KR2011/002598, filed on Apr. 12, 2011, the entire disclosure of each of which is incorporated herein by reference.

BACKGROUND OF THE INVENTION

1. Field of the Invention

The present invention relates generally to the field of eXtensible Markup Language (XML) Document Management (XDM), and more particularly, to communication with an XDM resource in an XDM environment.

2. Description of the Related Art

According to the Open Mobile Alliance (OMA), an XML Document Management (XDM) enabler defines a common mechanism that enables user-specific service-related information to be accessible to service enablers that need them. Such information is expected to be stored in a network where it can be located, accessed and manipulated (e.g. created, changed, deleted, and the like). XDM specifies how such information will be defined in well-structured XDM documents as well as a common protocol for accessing and manipulating such XDM documents.

XDM documents accessed and manipulated via XCAP are stored in logical repositories in the network, called an XDM Server (XDMS). Each repository is associated with a functional entity that uses its data to perform its functions. Each XDM document stored in an XDMS is described as an XCAP Application Usage that enables applications to use the document via XCAP.

OMA XDMv2.1 provides an XDM forward function that enables a user to forward an XML document stored in an XDMS to other users in the same domain or a different domain using XDCP commands. For example, when a user wishes to forward an XDM document to other users, an XDM client device residing in a user equipment of the user initiates an XDCP request to forward the XDM document. In performing the forwarding, the user either forwards the whole corresponding XDM document, or selectively forwards a part of the XDM document, or forwards the XDM document after modifying a part of it. The XDCP request includes a request Uniform Resource Identifier (URI) or URI of the XDM document, type of the XDCP request, list of recipients, and filters (if any). The XDCP request is then routed to a corresponding XDMS. Accordingly, the corresponding XDMS processes the received XDCP request and takes necessary action to forward the XDM document to other users.

Upon receiving the XDM document, a receiving user decides whether to accept the forwarded XDM document. When the receiving user accepts the XDM document, the forwarded XDM document is owned by the recipient user and is stored in a user directory of the user within the XDMS.

However, the sending user may not know whether the XDM document is successfully delivered to all of the intended XDM recipients. For example, one intended XDM recipient may set a preference on the network to accept the XDM document automatically while another may set a preference to automatically reject the XDM document. Consequently, the sending user may be unaware of all of these delivery statuses and may believe that the XDM document is successfully delivered to all of the intended XDM recipients.

SUMMARY OF THE INVENTION

Accordingly, the present invention has been made to solve the above-stated problems occurring in the prior art, and an aspect of the present invention provides a method and system for communicating delivery status of an eXtensible markup language (XML) Document Management (XDM) resource in an XDM environment.

In accordance with an aspect of the present invention, a method of an eXtensible Markup Language (XML) Document Management (XDM) server for communicating a delivery status of an XDM resource in an XDM environment is provided. The method includes receiving a request for forwarding the XDM resource to one or more intended XDM recipient devices from an XDM client device; forwarding the XDM resource to the one or more intended XDM recipient devices; and communicating the delivery status associated with delivery of the XDM resource to the one or more intended XDM recipient devices to the XDM client device.

In accordance with another aspect of the present invention, a non-transitory computer-readable recording medium having recorded thereon a computer program for executing a method of an eXtensible Markup Language (XML) Document Management (XDM) server communicating a delivery status of an XDM resource in an XDM environment is provided. The method includes receiving a request for forwarding the XDM resource to one or more intended XDM recipient devices from an XDM client device; forwarding the XDM resource to the one or more intended XDM recipient devices; and communicating the delivery status associated with delivery of the XDM resource to the one or more intended XDM recipient devices to the XDM client device.

In accordance with another aspect of the present invention, a method of an eXtensible Markup Language (XML) Document Management (XDM) client device for communicating an XDM resource in an XDM environment is provided. The method includes sending a request for forwarding the XDM resource to one or more intended XDM recipient devices to an XDM Server (XDMS); receiving a notification indicating a delivery status associated with delivery of the XDM resource to the one or more intended XDM recipient devices; and retrieving the delivery status associated with the delivery of the XDM resource from the XDMS based on the notification.

In accordance with another aspect of the present invention, a non-transitory computer-readable recording medium having recorded thereon a computer program for executing a method of an eXtensible Markup Language (XML) Document Management (XDM) client device for communicating an XDM resource in an XDM environment is provided. The method includes sending a request for forwarding an XDM resource to one or more intended XDM recipient devices to an XDM Server (XDMS); receiving a notification indicating a delivery status associated with delivery of the XDM resource to the one or more intended XDM recipient devices; and retrieving the delivery status associated with the delivery of the XDM resource from the XDMS based on the notification.

BRIEF DESCRIPTION OF THE DRAWINGS

The above and other aspects, features and advantages of the present invention will be more apparent from the following detailed description taken in conjunction with the accompanying drawings, in which:

FIGS. 2A and 2B are flow diagrams illustrating a method of communicating delivery status associated with delivery of an XDM resource to intended XDM recipient devices associated with recipients in different domains, according to another embodiment of the present invention;

DETAILED DESCRIPTION OF EMBODIMENTS OF THE PRESENT INVENTION

The present invention provides a method and system for communicating delivery status of an eXtensible Markup Language (XML) Document Management (XDM) resource in an XDM environment. In the following detailed description of the embodiments of the invention, reference is made to the accompanying drawings.

Figure 1:
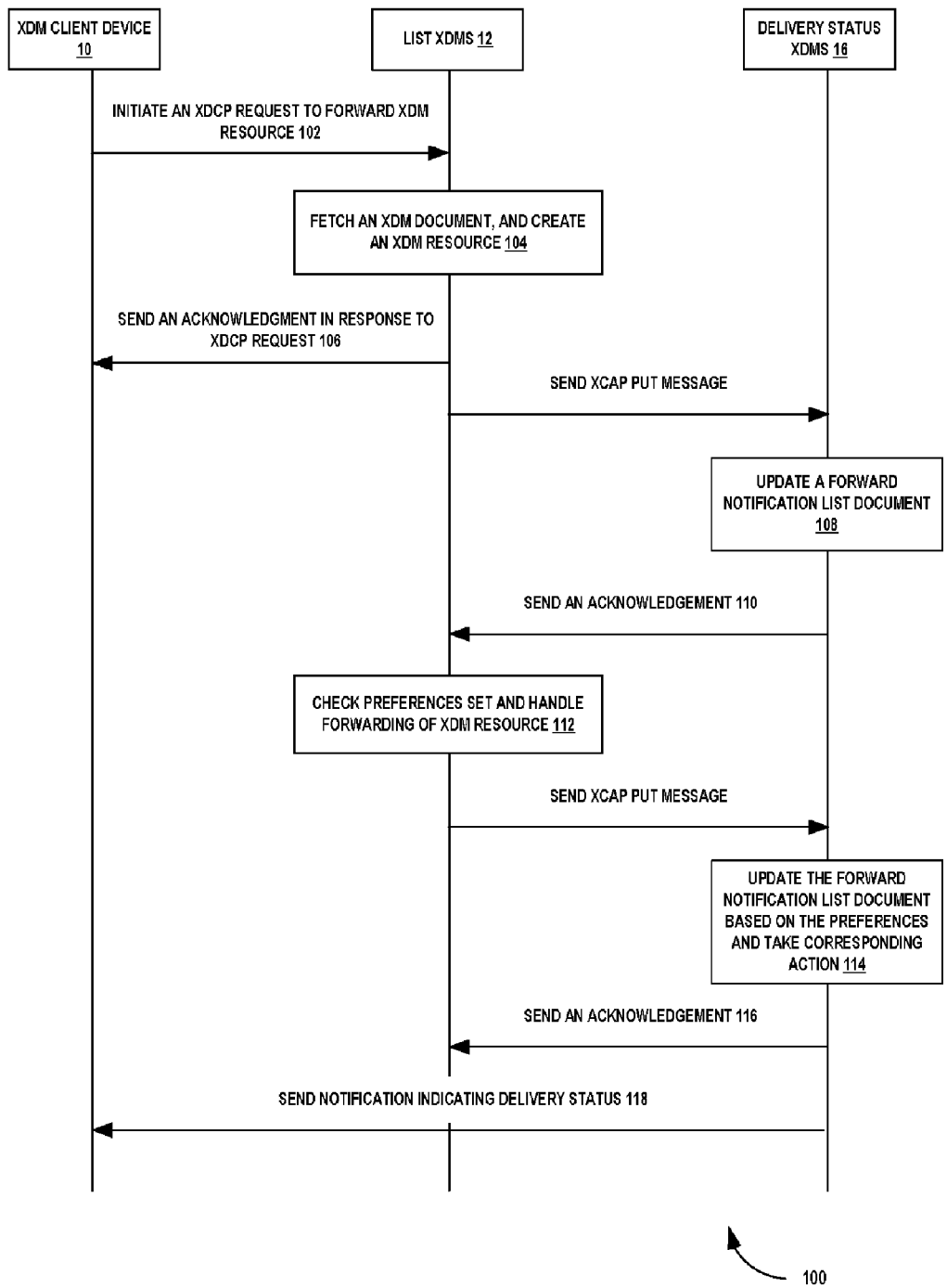
FIG. 1 is a flow diagram illustrating a method of communicating a delivery status associated with the delivery of an eXtensible Markup Language (XML) Document Management (XDM) resource to intended XDM recipient devices when recipients are in the same domain, according to an embodiment of the present invention.

FIG. 1 is a flow diagram 100 illustrating a method of communicating delivery status associated with the delivery of an XDM resource to intended XDM recipient devices when recipients are in the same domain, according to one embodiment. At step 102, an XDM client device 10 initiates an XDM Command Protocol (XDCP) request for forwarding an XDM resource to the intended XDM recipient devices. The XDCP request includes a request URL of the XDCP request that is set to the URL of an XDM document, a type of the XDCP request that is set to forward, a list of recipients to whom the XDM resource has to be forwarded, a delivery report indication, and any filter information in case the user wants to forward only parts of the XDM document. The structure of the XDCP request is shown below:

```
<request id="ajkg896"> Forward </request>
    <recipients-list>
        <list>
            <entry uri="sip:alice@foo.com"/>
            <entry uri="sip:bob@foo.com"/>
            <entry uri="sip:adam@foo.com"/>
        </list>
    </recipients-list>
    <delivery-report> true </delivery-report>
</request>
```

Further, while the XDCP request is initiated, a unique identifier is inserted in the XDCP request. The unique identifier is a random number generated by the XDMC to keep track of the forwarded XDM resource. The XDCP request is then routed to the corresponding XDMS.

In one embodiment, it is possible that the sender of the XDM resource wants to receive the delivery report only from certain recipients instead of from all the recipients. In order to accomplish this, an attribute named "delivery-report" is added with the <entry> element. Hence, in this request, the separate element <delivery-report> is not needed. For example, a sample structure of the XDCP document in the body of the XDCP request meant for forwarding a XDM resource is shown below:

```
<request id="ajkg896"> Forward </request>
    <recipients-list>
        <list>
            <entry uri="sip:alice@foo.com" delivery-report="true"/>
            <entry uri="sip:bob@foo.com" delivery-report="true"/>
            <entry uri="sip:adam@foo.com" delivery-report="false"/>
        </list>
    </recipients-list>
</request>
```

In step 104, the List XDMS 12 processes the received XDCP request. In one embodiment, the List XDMS retrieves an XDM document to be forwarded. Also, in step 104, the List XDMS 12 applies filters (if present in the XDCP request) to the retrieved XDM document to create an XDM resource to be forwarded to the intended XDM recipient devices.

In step 106, the List XDMS 12 sends an acknowledgement to the XDM client device 10 in response to the receipt of the XDCP request. After step 106, an XDMS 16 creates an entry in the forward notification list document of the sender associated with the XDM client device 10 with parameters such as request ID or unique identifier received in the XDCP request, a URL of the XDM document to be forwarded, a list of recipients, a status of the forward XDCP request (initially, the status of the XDCP request is 'pending'), a content type of the forwarded content, a size of the forwarded content, a delivery time and delivery expiration period via the XCAP PUT when a delivery status of the XDM resource is requested. In step 108, the XDMS 16 updates the forward notification list document of the sender with the content carried in the XCAP PUT.

In step 110, the XDMS 16 sends an acknowledgement to the List XDMS 12. In step 112, the List XDMS 12 checks preferences set by the users of the intended XDM recipient devices, and forwards the final XDM resource to the intended XDM recipient devices based on the preferences accordingly. The preferences include accepting the XDM resource, rejecting the XDM document, and confirming prior to accepting/rejecting the XDM resource. In some cases, the recipient cannot have a XUI as the identifier. For example, the user can have an email address or a E.164 number, etc. The XDMS processes the received XDCP request by the enabler-dependent interworking function. In the case of Open Mobile Alliance Converged Address Book (OMA CAB) service, the XDMS sends contacts to be shared using Messaging Enabler (e.g., Converged IP Messaging (CPM) Interworking Function (IWF)) to the non-CAB user with the email address. If the sender wants to receive the XDM forward delivery report, then this can be achieved through CPM IWF.

In step 114, the XDMS 16, on the receiving the XCAP PUT request from the List XDMS 12, updates the forwarding notification list entry created in the step 108 based on the preferences set by the users and the corresponding action taken by the List XDMS.

In step 116, the XDMS 16 sends an acknowledgment to the List XDMS 12 upon updating the forward notification list document. In step 118, the XDMS 16 sends a notification to the XDM client device 10 indicating a change in delivery status in the forward notification list document. This is, when the user of the XDM client device 10 subscribes to receive notifications from the XDMS 16 when any changes are made in the forwarding notification list document. The delivery status indicates whether the XDM resource is rejected, accepted, pending for confirmation, or expired. The XDMS 16 sends notifications to the XDM client device 10 based user preference or server policy. Alternatively, the XDM client device 10 retrieves the forward notification list document to find out the delivery status of the XDM resource to the intended XDM recipient devices. In one implementation, the XDM client device 10 retrieves the forward notification list document by synchronization with the XDMS 16. Thus, by retrieving the forward notification list document, the XDM client device 10 obtains delivery status associated with each of the XDCP requests. A structure indicating the delivery report is shown below:

```
<delivery-notification-list>
    <request id="ajkg896">
        <document-uri>resource-lists/users/sip:joe@foo.com/index
        </document-uri>
        <size> 6000 </size>
        <forwarded-time> 2010-04-01T11:59 </forwarded-time>
    <content-type> application/vnd.oma.resource-list+xml
    </content-type>
    <recipients-list>
            <entry uri="sip:alice@foo.com" status="delivered"
time="2010-04-01T15:00"/>
            <entry uri="sip:bob@foo.com" status="rejected"/>
            <entry uri="sip:adam@foo.com", status="pending"/>
        </recipients-list>
    </request>
</delivery-notification-list>
```

It will be understood that, the delivery status is displayed on a display of the XDM client device 10 (e.g., a mobile device, a Personal Digital Assistant (PDA), tablet, and the like).

In an embodiment, consider that a user Joe, who has the address "sip:joe@foo.com" wants to forward his football buddy list in his XDM document to his friends Alice, who has the address "sip:alice@foo.com", Bob, who has the address "sip:bob@foo.com" and Adam, who has the address "sip: adam@foo.com". Also, consider that, Alice has set a preference to accept any XDM resource from Joe and Bob have set a preference to reject any XDM resource from any user. Further, Adam has a preference to confirm any XDM resource. The XDM client device 10 of Joe creates an XDCP request targeting the List XDMS 12. The XDCP request contains a request ID "ahj8345", reception of delivery report set to true, list of intended XDM recipients, and a filter to send the XDM resource only to "football_buddies" from his XDM document.

The List XDMS 12, on the receiving the above XDCP request, retrieves an XDM resource and creates a final XDM resource based on a filter in the XDCP request. The List XDMS 12 then sends an acknowledgement to the XDM client device 10 in response to receipt of the XDCP request. Then, the XDMS 16 creates an entry in the forward notification list document of the sender associated with the XDM client device 10 with parameters such as request ID or unique identifier received in the XDCP request, URL of the XDM document to be forwarded, list of recipients, status of the forward XDCP request (e.g., initially the status of the XDCP request is 'pending'), content type of the forwarded content, size of the forwarded content, delivery time and delivery expiry period via the XCAP PUT when a delivery status of delivery status of the XDM resource is requested. The XDMS 16 upon receiving the above request, updates the forwarding notification list document of the user Joe with the following details:

```
<delivery-notification-list>
 <request id="ahj8345">
    <document-uri>resource-lists/users/sip:joe@foo.com/index
    </document-uri>
    <size> 6000 </size>
    <forwarded-time> 2010-04-01T11:59 </forwarded-time>
```

```
<content-type> application/vnd.oma.resource-list+xml
    </content-type>
    <recipients-list>
            <entry uri="sip:alice@foo.com" status="pending"/>
            <entry uri="sip:bob@foo.com" status="pending"/>
            <entry uri="sip:adam@foo.com", status="pending"/>
        </recipients-list>
    </request>
</delivery-notification-list>
```

The XDMS 16 sends an acknowledgement to the List XDMS 12. Then the ListXDMS 12 checks the preferences set by Alice, Bob and Adam and accordingly handles forwarding of the XDM resource to Alice, Bob, and Adam. Moreover, based on the preferences set by the user the List XDMS 12 takes corresponding action. Also, the XDMS 16 updates delivery status associated with Alice, Bob, and Adam in the forward notification list document as shown below:

```
<delivery-notification-list>
 <request id="ahj8345">
    <document-uri>resource-lists/users/sip:joe@foo.com/index
    </document-uri>
    <size> 6000 </size>
 <forwarded-time> 2010-04-01T11</forwarded-time>
    <content-type> application/vnd.oma.resource-list+xml
    </content-type>
    <recipients-list>
            <entry uri="sip:alice@foo.com" status="delivered"
time="2010-04-01T15:00"/>
            <entry uri="sip:bob@foo.com" status="rejected"/>
            <entry uri="sip:adam@foo.com", status="pending"/>
        </recipients-list>
    </request>
</delivery-notification-list>
```

The delivery status can be "expired" when the time of delivery expires due to the unexpected reception delay by any of the intended XDM recipients. The XDMS 16 then sends an acknowledgment to the List XDMS 12 upon updating the forward notification list document. Now, Joe can track the status of delivery of the XDM resource by subscribing to the changes made to the forwarding notification list document or retrieving the forward notification list document.

Figure 2B:
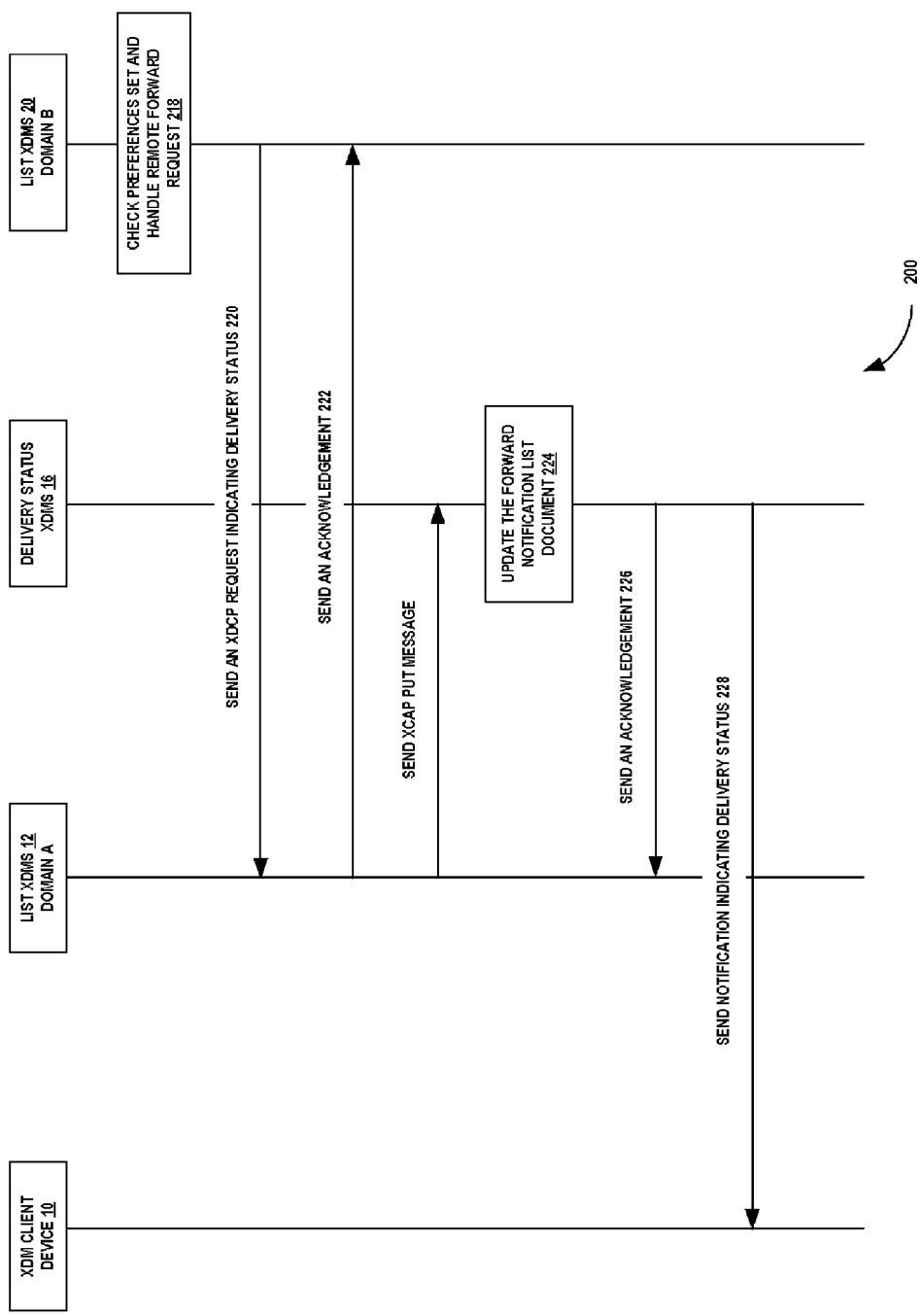

FIGS. 2A and 2B are flow diagrams 200 illustrating a method of communicating delivery status associated with the delivery of an XDM resource to intended XDM recipient devices associated with recipients in different domain, according to another embodiment. The below methods steps illustrate a scenario when intended XDM recipient devices are associated with a domain different than the domain of the XDM client device 10. At step 202, an XDM client device 10 initiates an XDCP request for forwarding an XDM resource to intended XDM recipient devices. The XDCP request includes a request URL of the XDCP request that is set to URL of an XDM document, a type of the XDCP request that is set to forward, a list of recipients to whom the XDM resource has to be forwarded, a delivery report indication and any filter information in case the user wants to forward only parts of the XDM document. Moreover, while the XDCP request is initiated, a unique identifier is inserted in the XDCP request. The unique identifier is a random number generated by the XDMC to keep track of the forwarded XDM resource. The XDCP request is then routed to the corresponding XDMS.

At step 204, the List XDMS 12 processes the received XDCP request. In one example, the List XDMS retrieves an XDM document to be forwarded. Moreover, in step 204, the List XDMS 12 applies filters (if present in the XDCP request) to the retrieved XDM document to create an XDM resource to be forwarded to the intended XDM recipient devices.

In step 206, the List XDMS 12 sends an acknowledgement to the XDM client device 10 in response to the receipt of the XDCP request. After step 206, the XDMS 16 creates an entry in the forward notification list document of the sender associated with the XDM client device 10 with parameters such as a request ID or a unique identifier received in the XDCP request, the URL of the XDM document to be forwarded, list of recipients, a status of the forward XDCP request (e.g., initially the status of the XDCP request is 'pending'), a content type of the forwarded content, a size of the forwarded content, a delivery time and delivery expiration period via the XCAP PUT when a delivery status of the XDM resource is requested. In step 208, an XDMS 16, upon receiving the above request, updates the forward notification list document of the sender associated with the XDM client device 10 with the content carried in the XCAP PUT. In step 210, the XDMS 16 sends an acknowledgement to the List XDMS 12.

Since the intended XDM recipients do not reside in the same domain as the List XDMS 12, the List XDMS 12 in the originating domain creates a remote forward request at step 212. The remote forward request includes a request ID, a reception of delivery report (set to true), a List of recipients, and a URI of the final XDM resource created by the originating List XDMS 12 by applying the filters provided in the XDCP request received from the XDM client device 10. The List XDMS 12 stores the XDM resource document in a temporary storage and provides the URI of the temporary storage in the remote forward request. In step 214, the List XDMS 12 routes the remote forward request to a List XDMS 20 in the terminating domain. In step 216, the List XDMS 20 acknowledges the receipt of the remote forward request.

At step 218, the List XDMS 20 on the terminating domain checks the preferences of the intended XDM recipient devices and handles the remote forward request based on the preferences accordingly. In step 220, the List XDMS 20 sends an XDCP request to the List XDMS 12 indicating a request type, a URI or address associated with one or more intended recipients, a delivery status of the remote forward request, and the request ID received in the XDCP request. Thus, the terminating List XDMS 20 acts as an XDM Agent when creating the XDCP request for the delivery report. The terminating List XDMS 20 creates an XDCP request for the delivery report for each of the recipients or may create a single request containing the status of delivery report related to all the recipients.

Upon receiving the XDCP request, the List XDMS 12 sends an acknowledgement to the List XDMS 20 in step 222. In step 224, the XDMS 16 updates the delivery status of the XDM resource to the intended XDM recipient devices in the forward notification list document. In step 226, the XDMS 16 sends a acknowledgment to the List XDMS 12 upon updating the forward notification list document. In step 228, the XDMS 16 sends a notification to the XDM client device 10 indicating change in delivery status in the forward notification list document.

In another embodiment, a user Joe, who has an address "sip:joe@foo.com", wishes to forward his football buddy list residing in his XDM document to his friends Alice, who has the address "sip:alice@example.com", Bob, who has the address "sip:bob@example.com" and Adam, who has the address "sip:adam@example.com". Moreover, Alice has set a preference to accept any XDM resource from Joe and Bob has set a preference to reject any XDM resource from any user. Further, Adam has set a preference to confirm any XDM resource. It can be observed from the address of the sending user Joe and the intended recipients Alice, Bob and Adams that the recipients are associated with a different domain from the sending user.

In such a case, the List XDMS 12 generates a remote forward request which contains a request ID reception of delivery report set to true, a List of recipients (i.e., Alice, Bob and Adam), and a URI of the final XDM Resource created by the originating list XDMS 12 by applying the filters provided in the XDCP request received from the XDM client device 10. The List XDMS 12 stores the XDM resource in a temporary storage and provides the URI of the temporary storage in the remote forward request. Subsequently, the remote forward request is routed to the List XDMS 20 in the terminating domain. The List XDMS 20 in the terminating domain sends an acknowledgement to the List XDMS 12 to confirm the receipt of the remote forward request.

Further, the List XDMS 20 checks the preferences of Alice, Bob and Adam and accordingly sends a XDCP request indicating the delivery status associated with Alice, Bob and/or Adam to the List XDMS 12. The List XDMS 20 then updates the list document of the recipients with the received content.

The List XDMS 20 then makes an XDCP request to the list XDMS 12 including details such as a request type set to "Forward Delivery Report", a recipient URI, a status of the remote forward request, and the request ID received in the remote forward request.

Thus, the List XDMS 20 acts as an XDM agent when creating the XDCP request for the delivery report. The List XDMS 20 creates an XDCP request for the delivery report for each of the recipients or creates a single request containing the status of delivery report related to all the recipients. Further, the List XDMS 12 sends an acknowledgement back to the List XDMS 20. The XDMS 16 then updates the forwarding notification list document of the user with the status of delivery reported from Alice, Bob and Adam. The XDMS 16, where the forwarding notification list document resides, sends acknowledgement back to the List XDMS 12. A forward notification list document structure indicating a delivery status is shown below:

```
<delivery-notification-list>
  <request id="fgju78334065">
    <document-uri>resource-lists/users/sip:joe@foo.com/index
    </document-uri>
    <size> 8000 </size>
    <forwarded-time> 2010-04-01T11</forwarded-time>
    <recipients-list>
       <entry uri="sip:alice@ example.com" status="delivered"/
time="2010-04-01T15:00">
       <entry uri="sip:bob@ example.com" status="pending"/>
       <entry uri="sip:adam@ example.com", status="rejected"/>
    </recipients-list>
  </request>
</delivery-notification-list>
```

The List XDMS 12, upon receiving the delivery status XDCP request from the List XDMS 20 checks whether the identity of the principal in the delivery report XDCP request and whether the request ID exists in the delivery report XDCP request. If it exists, the XDMS updates the "status" attribute of the <entry> element with the value received in the XDCP request.

From the above example, the owner of the XDM document (i.e., the sender) can interpret that a request with the unique id "fgju78334065" is the forward request targeted at the List document, the XDCP request has been forwarded to Alice, Bob, and Adam and Alice has accepted the forwarded XDM resource, Adam rejected the forwarded XDM resource and the status from Bob is yet to be received.

In accordance with one or more embodiments described above, the XDM client device 10 may opt for delivery status for selective recipients rather than delivery status associated with all recipients. This is achieved by adding the attribute 'delivery-report' with an <entry> element and hence a separate element <delivery-report> is not required. The schema for indicating selective delivery status in the XDCP request is shown below:

```
<request id="ajkg896"> Forward </request>
  <recipients-list>
    <list>
      <entry uri="sip:alice@foo.com" delivery-report="true"/>
      <entry uri="sip:bob@foo.com" delivery-report="true"/>
      <entry uri="sip:adam@foo.com" delivery-report="false"/>
    </list>
  </recipients-list>
</request>
```

Moreover, the XDM client device 10 can share the delivery status of the XDM resource with one or more of the intended XDM recipient devices. This is achieved by adding a new element "share-delivery-report" in the XDCP request sent to the List XDMS 12. When the element "share-delivery-report" is present in the XDCP request and is set to true, the XDMS 16 allows the recipient(s) to access the forward notification list document containing the delivery status as shown below:

```
<request id="ajkg896"> Forward </request>
  <recipients-list>
    <list>
      <entry uri="sip:alice@foo.com"/>
      <entry uri="sip:bob@foo.com"/>
      <entry uri="sip:adam@foo.com"/>
    </list>
  </recipients-list>
  <delivery-report> true </delivery-report>
  <share-delivery-report> true </share-delivery-report>
</request>
```

The XDMS can restrict the recipients to access to only the Delivery Report for a particular request in which they are the recipients. Also, the availability of the shared delivery report should be notified to the recipients so that they can access the XDM Document containing the Delivery report. The XDMS in the recipient domain should add this element "share-delivery-report" in the Request Notification List that is proposed in OMA XDM2.1. Alternatively, the XDM client device 10 can update Access Permission Document to allow the one or more recipients to access the forward notification list document (considering this as a volatile data sharing of the delivery status through access permission mechanism is an overhead which involves an extra XCAP operation from the XDM client device 10 and clean-up operation to be performed by the XDMS 16).

Figure 3:
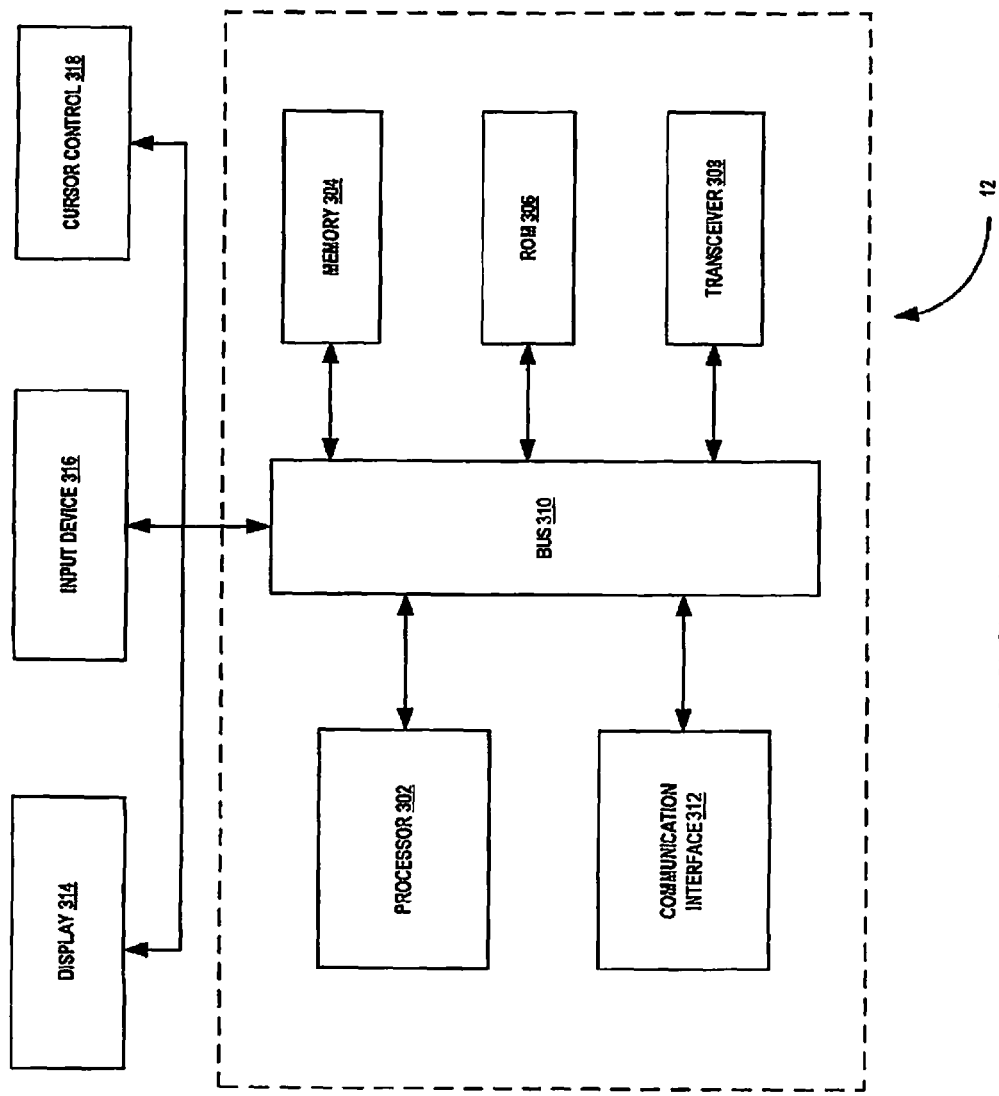
FIG. 3 is a block diagram illustrating an List XDMS showing components for implementing an embodiment of the present invention.

FIG. 3 is a block diagram of the List XDMS 12 showing various components for implementing embodiments of the present invention. In FIG. 3, the List XDMS 12 includes a processor 302, memory 304, a Read Only Memory (ROM) 306, a transceiver 308, a bus 310, a communication interface 312, a display 314, an input device 316, and a cursor control 318.

The processor 302, as used herein, can be any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a graphics processor, a digital signal processor, or any other type of processing circuit. The processor 302 also includes embedded controllers, such as generic or programmable logic devices or arrays, application specific integrated circuits, single-chip computers, smart cards, and the like.

The memory 304 and the ROM 306 may be volatile memory and non-volatile memory. The memory 304 includes instructions temporarily stored thereon to communicate delivery status of an XDM resource in an XDM environment, according to the embodiments of the present invention. A variety of computer-readable storage media may be stored in and accessed from the memory elements. Memory elements include any suitable memory device(s) for storing data and machine-readable instructions, such as ROM, Random Access Memory (RAM), erasable programmable read only memory, electrically erasable programmable read only memory, hard drive, removable media drive for handling memory cards, Memory Sticks™, and the like.

Embodiments of the present invention can be implemented in conjunction with modules, including functions, procedures, data structures, and application programs, for performing tasks, or defining abstract data types or low-level hardware contexts. Machine-readable instructions stored on any of the above-mentioned storage media are executable by the processor 302. For example, a computer program may include machine-readable instructions capable of communicating delivery status of an XDM resource in an XDM environment according to the teachings and herein described embodiments of the present invention. In one embodiment, the program is included on a storage medium and loaded from the storage medium to a hard drive in the non-volatile memory. The machine-readable instructions may cause the List XDMS 12 to encode according to the various embodiments of the present subject matter.

The transceiver 308 is capable of receiving a XDCP request from an XDM client device 10 and sending notification indicating the delivery status to the XDM client device 10. The bus 310 interconnects various components of the List XDMS 12. The components such as communication interfaces 312, the display 314, the input device 316, and the cursor control 318.

Figure 4:
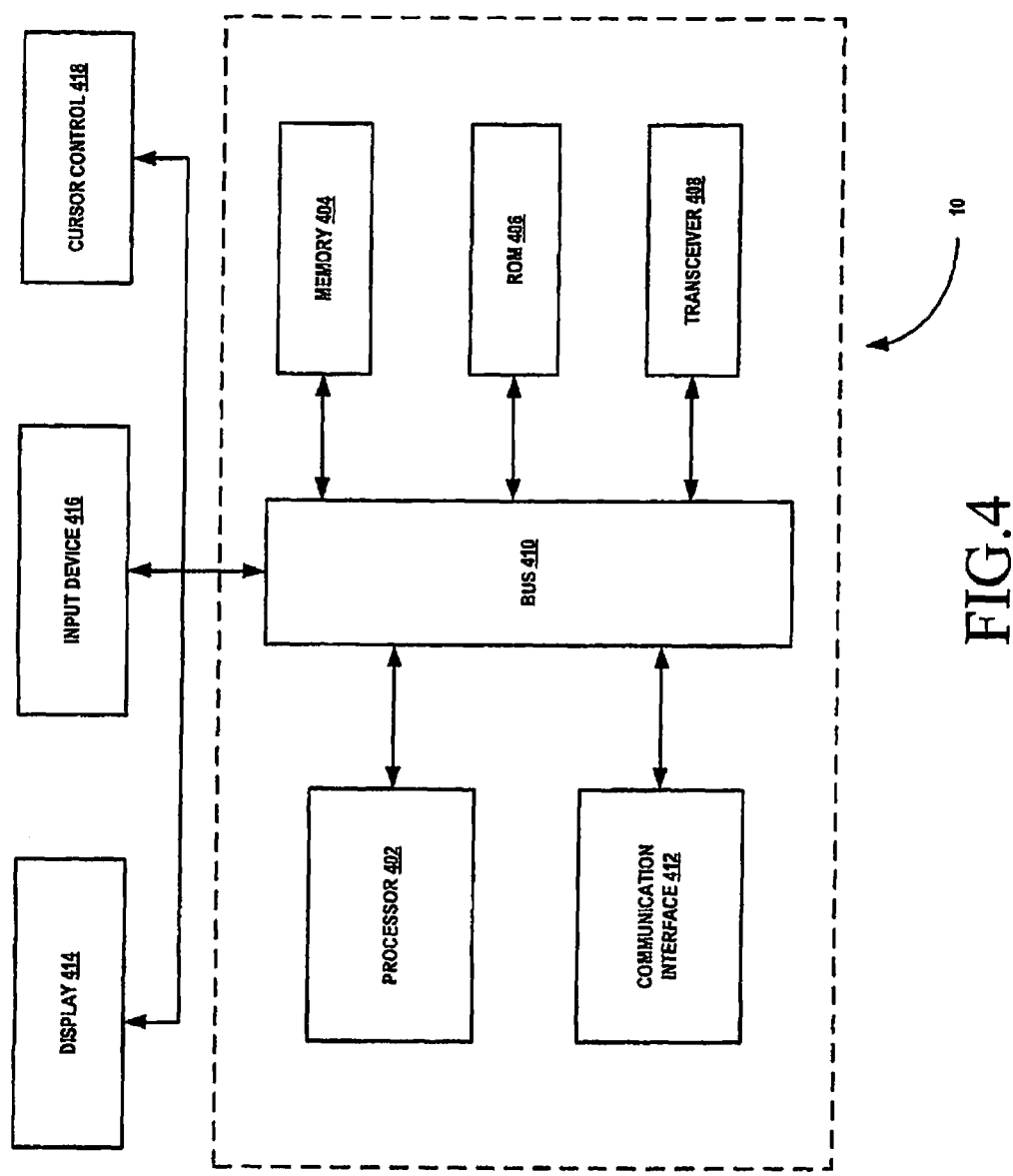
FIG. 4 is a block diagram illustrating an XDM client device showing various components for implementing an embodiment of the present invention.

FIG. 4 is a block diagram of the XDM client device 10 showing various components for implementing embodiments of the present invention. In FIG. 4, the XDM client device 10 includes a processor 402, memory 404, a Read Only Memory (ROM) 406, a transceiver 408, a bus 410, a communication interface 412, a display 414, an input device 416, and a cursor control 418.

The processor 402, as used herein, is any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a graphics processor, a digital signal processor, or any other type of processing circuit. The processor 402 may also include embedded controllers, such as generic or programmable logic devices or arrays, application specific integrated circuits, single-chip computers, smart cards, and the like.

The memory 404 and the ROM 406 may be volatile memory and non-volatile memory. The memory 404 includes instructions temporarily stored therein to forward an XDM resource to one or more XDM recipient devices and request delivery status of the XDM resource, according to the embodiments of the present invention. A variety of computer-readable storage media may be stored in and accessed from the memory elements. Memory elements may include any suitable memory device(s) for storing data and machine-readable instructions, such as ROM, RAM, erasable programmable read only memory, electrically erasable programmable read only memory, hard drive, removable media drive for handling memory cards, Memory Sticks™, and the like.

Embodiments of the present invention may be implemented in conjunction with modules, including functions, procedures, data structures, and application programs, for performing tasks, or defining abstract data types or low-level hardware contexts. Machine-readable instructions stored on any of the above-mentioned storage media may be executable by the processor 402. For example, a computer program may include machine-readable instructions capable of forwarding an XDM resource to one or more XDM recipient devices and requesting delivery status of the XDM resource. In one embodiment, the program may be included on a storage medium and loaded from the storage medium to a hard drive in the non-volatile memory. The machine-readable instructions may cause the XDM client device 10 to encode according to the various embodiments of the present invention.

The transceiver 408 may be capable of sending a XDCP request to the List XDMS 12 and receiving a notification indicating the delivery status from the XDMS 16. The bus 410 interconnects various components of the XDM client device 10. The components such as communication interfaces 412, the display 414, the input device 416, and the cursor control 418.

While the present invention has been shown and described with reference to certain embodiments and drawings of the portable terminal, it will be understood by those skilled in the art that various changes in form and details may be made therein without departing from the spirit and scope of the invention as defined by the appended claims and their equivalents.

The invention claimed is:

1. A method of an eXtensible Markup Language (XML) Document Management (XDM) server for communicating a delivery status of an XDM resource in an XDM environment, the method comprising:

receiving a request for forwarding the XDM resource to a plurality of intended XDM recipient devices from an XDM client device, the request for forwarding the XDM resource comprises attributes including a delivery report indication that is assigned for each of the plurality of intended XDM recipient devices and a type of the request whether the plurality of intended XDM recipient devices and the XDM client device are in the same domain;

forwarding the XDM resource to the plurality of intended XDM recipient devices; and communicating the delivery status associated with delivery of the XDM resource to each of the plurality of intended XDM recipient devices to the XDM client device, wherein the delivery report indication represents whether the XDM client device wants to receive a delivery report from each of the plurality of intended XDM recipient devices;

determining whether the plurality of intended XDM recipient devices and the XDM client device are in a same domain;

when the plurality of intended XDM recipient devices and the XDM client device are not in the same domain, generating and sending a remote forward request to an associated XDMS in a remote domain, wherein the remote forward request comprises a unique identifier, the address of each of the plurality of intended XDM recipient devices, the delivery report indication, and an unique resource identifier associated with the XDM resource;

receiving the delivery status associated with delivery of the XDM resource to each of the plurality of intended XDM recipient devices from another XDMS;

determining whether an identifier in the delivery status matches the unique identifier in the remote forward request;

when the identifier in the delivery status matches the unique identifier, updating the delivery status associated with delivery of the XDM resource to each of the plurality of intended XDM recipient devices in a forward notification list document; and when the identifier in the delivery status does not match the unique identifier, ignoring the delivery status received from the another XDMS.

2. The method of claim 1, wherein the request for forwarding the XDM resource comprises an XDM eCommand Protocol (XDCP) request.

3. The method of claim 1, wherein the request for forwarding the XDM resource further comprises attributes including at least one of a unique resource locator associated with the request, an address of each of the plurality of intended XDM recipient devices, and filter information.

4. The method of claim 3, wherein receiving the request for forwarding the XDM resource to the plurality of intended XDM recipient devices from the XDM client device comprises:

retrieving an XDM document upon receiving the request to forward at least one XDM resource;

creating the XDM resource from an XDM document based on the attributes in the received request; and updating the attributes in the received request in a forward notification list document when the request is received from the XDM client device.

5. The method of claim 4, wherein forwarding the XDM resource to the plurality of intended XDM recipient devices comprises when the plurality of intended XDM recipient devices and the XDM client device are in the same domain, checking preferences set by each of the plurality of intended XDM recipient devices.

6. The method of claim 5, wherein checking preferences set by the plurality of intended XDM recipient devices further comprises:

updating the delivery status associated with delivery of the XDM resource to each of the plurality of intended XDM recipient devices in the forward notification list document based on the preferences set by the plurality of intended XDM recipient devices.

7. The method of claim 1, wherein while receiving the delivery status associated with delivery of the XDM resource to the plurality of intended XDM recipient devices from the another XDMS, the delivery status associated with the delivery of the XDM resource is determined based on preferences set by the plurality of intended XDM recipient devices.

8. The method of claim 7, wherein the preference set by the plurality of intended XDM recipient devices comprises accepting the XDM resource, rejecting the at least one XDM document, and confirming prior to accepting the XDM resource.

9. The method of claim 8, wherein the delivery status is at least one of delivered, pending, rejected, and expired.

10. The method of claim 9, wherein communicating the delivery status received from the plurality of intended XDM recipient devices to the XDM client device comprises:

sending a notification to the XDM client device indicating a change of delivery status of the XDM resource.

11. The method of claim 1, further comprising:
sharing the delivery status associated with delivery of the XDM resource to the plurality of intended XDM recipient devices with the plurality of intended XDM recipient devices.

12. A non-transitory computer-readable recording medium having recorded thereon a computer program for executing a method of an eXtensible Markup Language (XML) Document Management (XDM) server communicating a delivery status of an XDM resource in an XDM environment, the method comprising:
receiving a request for forwarding the XDM resource to a plurality of intended XDM recipient devices from an XDM client device, the request for forwarding the XDM resource comprises attributes including a delivery report indication that is assigned for each of the plurality of intended XDM recipient devices and a type of the request whether the plurality of intended XDM recipient devices and the XDM client device are in the same domain;
forwarding the XDM resource to the plurality of intended XDM recipient devices; and
communicating the delivery status associated with delivery of the XDM resource to the plurality of intended XDM recipient devices to the XDM client device, wherein the delivery report indication represents whether the XDM client device wants to receive a delivery report from each of the plurality of intended XDM recipient devices;
determining whether the plurality of intended XDM recipient devices and the XDM client device are in a same domain;
when the plurality of intended XDM recipient devices and the XDM client device are not in the same domain, generating and sending a remote forward request to an associated XDMS in a remote domain, wherein the remote forward request comprises a unique identifier, the address of each of the plurality of intended XDM recipient devices, the delivery report indication, and an unique resource identifier associated with the XDM resource;
receiving the delivery status associated with delivery of the XDM resource to each of the plurality of intended XDM recipient devices from another XDMS;
determining whether an identifier in the delivery status matches the unique identifier in the remote forward request;
when the identifier in the delivery status matches the unique identifier, updating the delivery status associated with delivery of the XDM resource to each of the plurality of intended XDM recipient devices in a forward notification list document; and
when the identifier in the delivery status does not match the unique identifier, ignoring the delivery status received from the another XDMS.

13. A method of an eXtensible Markup Language (XML) Document Management (XDM) client device for communicating an XDM resource in an XDM environment, the method comprising:
sending a request for forwarding the XDM resource to a plurality of intended XDM recipient devices to an XDM Server (XDMS);
receiving a notification indicating a delivery status associated with delivery of the XDM resource to the plurality of intended XDM recipient devices, the request for forwarding the XDM resource comprises attributes including a delivery report indication that is assigned for each of the plurality of intended XDM recipient devices and a type of the request whether the plurality of intended XDM recipient devices and the XDM client device are in the same domain; and
retrieving the delivery status associated with the delivery of the XDM resource from the XDMS based on the notification, wherein the delivery report indication represents whether the XDM client device wants to receive a delivery report from each of the plurality of intended XDM recipient devices;
determining whether the plurality of intended XDM recipient devices and the XDM client device are in a same domain;
when the plurality of intended XDM recipient devices and the XDM client device are not in the same domain, generating and sending a remote forward request to an associated XDMS in a remote domain, wherein the remote forward request comprises a unique identifier, the address of each of the plurality of intended XDM recipient devices, the delivery report indication, and an unique resource identifier associated with the XDM resource;
receiving the delivery status associated with delivery of the XDM resource to each of the plurality of intended XDM recipient devices from another XDMS;
determining whether an identifier in the delivery status matches the unique identifier in the remote forward request;
when the identifier in the delivery status matches the unique identifier, updating the delivery status associated with delivery of the XDM resource to each of the plurality of intended XDM recipient devices in a forward notification list document; and
when the identifier in the delivery status does not match the unique identifier, ignoring the delivery status received from the another XDMS.

14. The method of claim 13, wherein the request for forwarding the XDM resource further comprises attributes including at least one of a unique resource locator associated with the request, an address of each of the plurality of intended XDM recipient devices, a filter information, and a share delivery status indication.

15. The method of claim 13, wherein retrieving the delivery status associated with the delivery of the XDM resource from the XDMS comprises:
retrieving the forward notification list document from the XDMS upon receiving the notification, wherein the forward notification list document indicates a delivery status associated with the delivery of the XDM resource; and
displaying the delivery status in the retrieved forward notification list document on a display of the XDM client device.

16. A non-transitory computer-readable recording medium having recorded thereon a computer program for executing a method of an eXtensible Markup Language (XML) Document Management (XDM) client device for communicating an XDM resource in an XDM environment, the method comprising:
sending a request for forwarding an XDM resource to a plurality of intended XDM recipient devices to an XDM Server (XDMS), the request for forwarding the XDM resource comprises attributes including a delivery report indication that is assigned for each of the plurality of intended XDM recipient devices and a type of the request whether the plurality of intended XDM recipient devices and the XDM client device are in the same domain;

receiving a notification indicating a delivery status associated with delivery of the XDM resource to the plurality of intended XDM recipient devices; and retrieving the delivery status associated with the delivery of the XDM resource from the XDMS based on the notification, wherein the delivery report indication represents whether the XDM client device wants to receive a delivery report from each of the plurality of intended XDM recipient devices;

determining whether the plurality of intended XDM recipient devices and the XDM client device are in a same domain;

when the plurality of intended XDM recipient devices and the XDM client device are not in the same domain, generating and sending a remote forward request to an associated XDMS in a remote domain, wherein the remote forward request comprises a unique identifier, the address of each of the plurality of intended XDM recipient devices, the delivery report indication, and an unique resource identifier associated with the XDM resource;

receiving the delivery status associated with delivery of the XDM resource to each of the plurality of intended XDM recipient devices from another XDMS;

determining whether an identifier in the delivery status matches the unique identifier in the remote forward request;

when the identifier in the delivery status matches the unique identifier, updating the delivery status associated with delivery of the XDM resource to each of the plurality of intended XDM recipient devices in a forward notification list document; and when the identifier in the delivery status does not match the unique identifier, ignoring the delivery status received from the another XDMS.

17. The method of claim 16, wherein the request further comprises attributes including at least one of a unique identifier, an address of each of the plurality of intended XDM recipient devices, and a share delivery status indication.

18. The method of claim 16, wherein retrieving the delivery status associated with the delivery of the XDM resource from the XDMS comprises:

retrieving the forward notification list document from the XDMS upon receiving the notification, wherein the forward notification list document indicates a delivery status associated with the delivery of the XDM resource; and displaying the delivery status in the retrieved forward notification list document on a display of the XDM client device.

* * * * *